(No Model.) 4 Sheets—Sheet 1.
G. J. ALTHAM.
POWER TRANSMITTING MECHANISM.
No. 569,013. Patented Oct. 6, 1896.
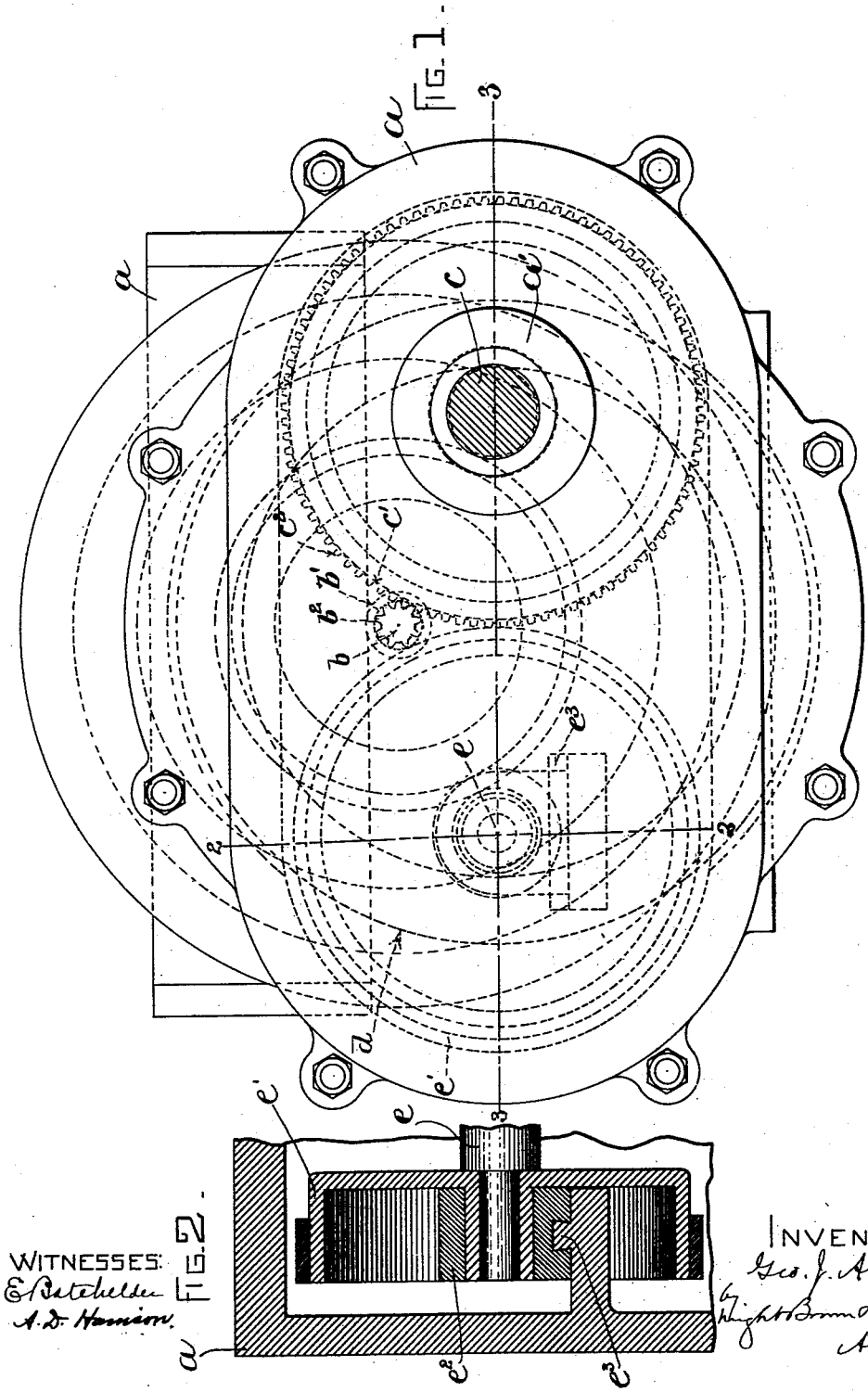

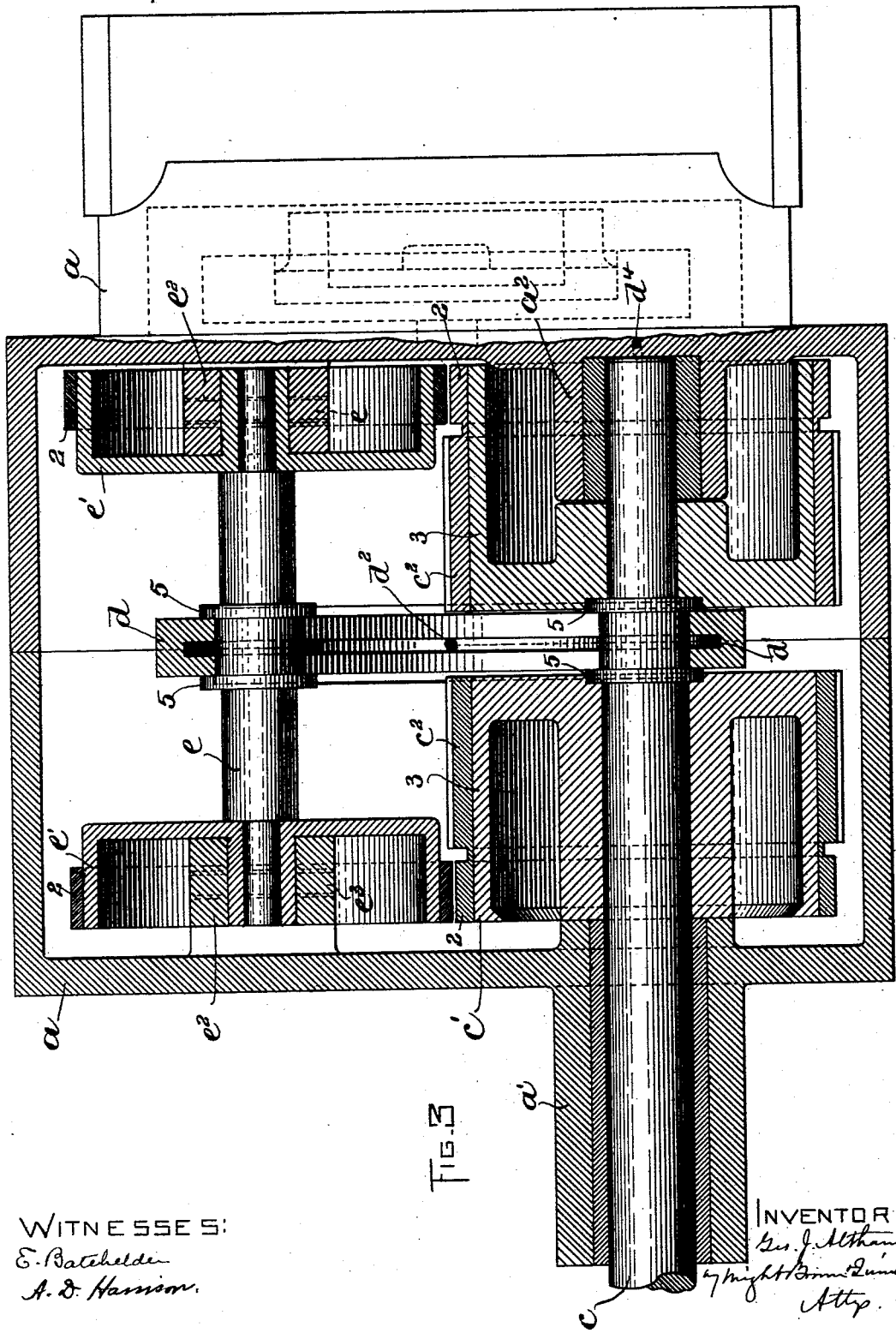

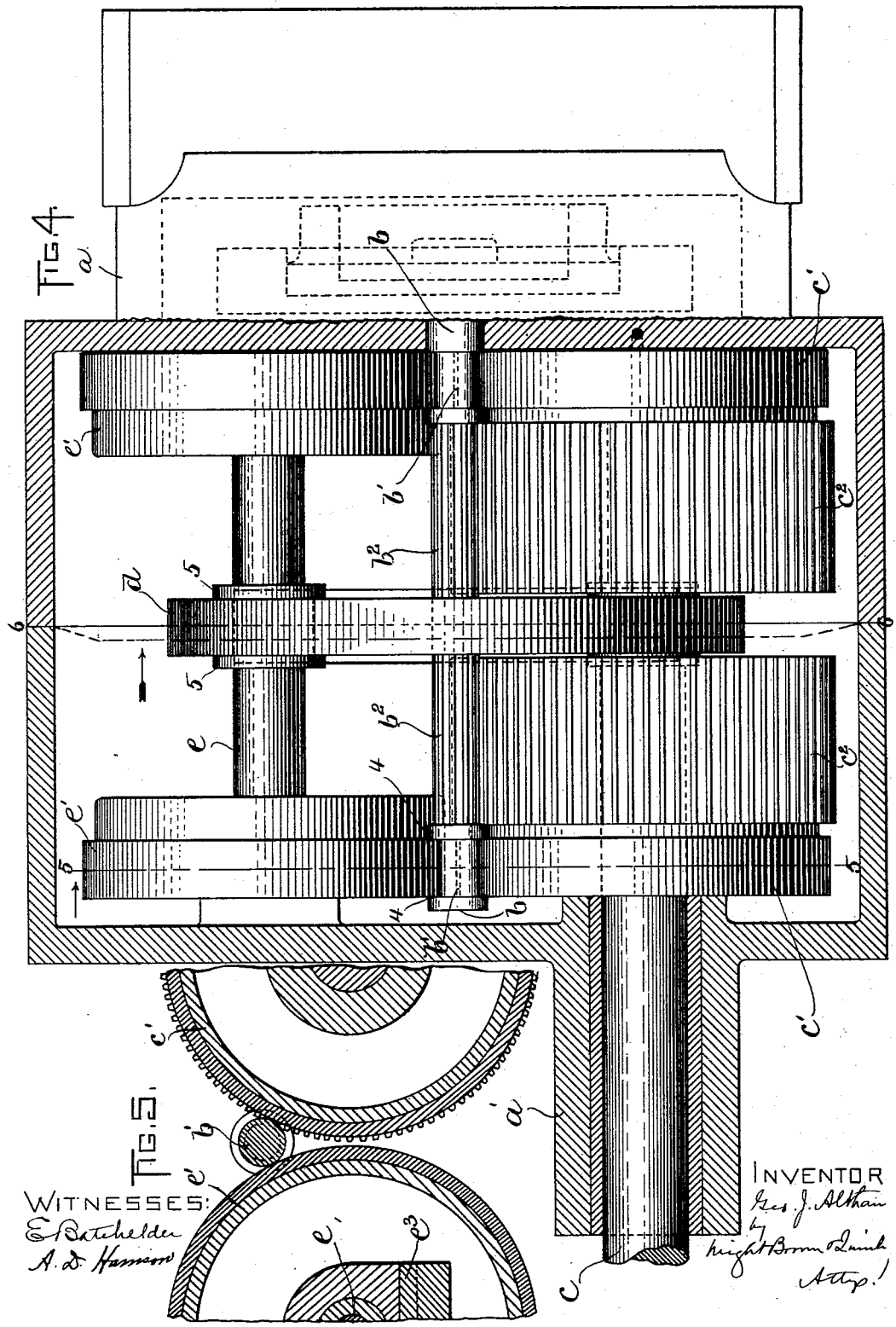

(No Model.)  4 Sheets—Sheet 4.

G. J. ALTHAM.
POWER TRANSMITTING MECHANISM.

No. 569,013.  Patented Oct. 6, 1896.

WITNESSES:  INVENTOR:

UNITED STATES PATENT OFFICE.

GEORGE J. ALTHAM, OF SWANSEA, MASSACHUSETTS.

POWER-TRANSMITTING MECHANISM.

SPECIFICATION forming part of Letters Patent No. 569,013, dated October 6, 1896.

Application filed October 8, 1895. Serial No. 565,009. (No model.)

*To all whom it may concern:*

Be it known that I, GEORGE J. ALTHAM, of Swansea, in the county of Bristol and State of Massachusetts, have invented certain new and useful Improvements in Power-Transmitting Mechanism, of which the following is a specification.

This invention has for its object to provide improved means for transmitting power from a motor, such as the steam-turbine set forth in Letters Patent of the United States No. 475,957, granted to me May 31, 1892, with the minimum loss of power by friction and without the necessity of lubricating the more rapidly rotating parts, such as the spindle of the turbine.

The invention consists in the improvements which I will now proceed to describe and claim.

Figure 6:
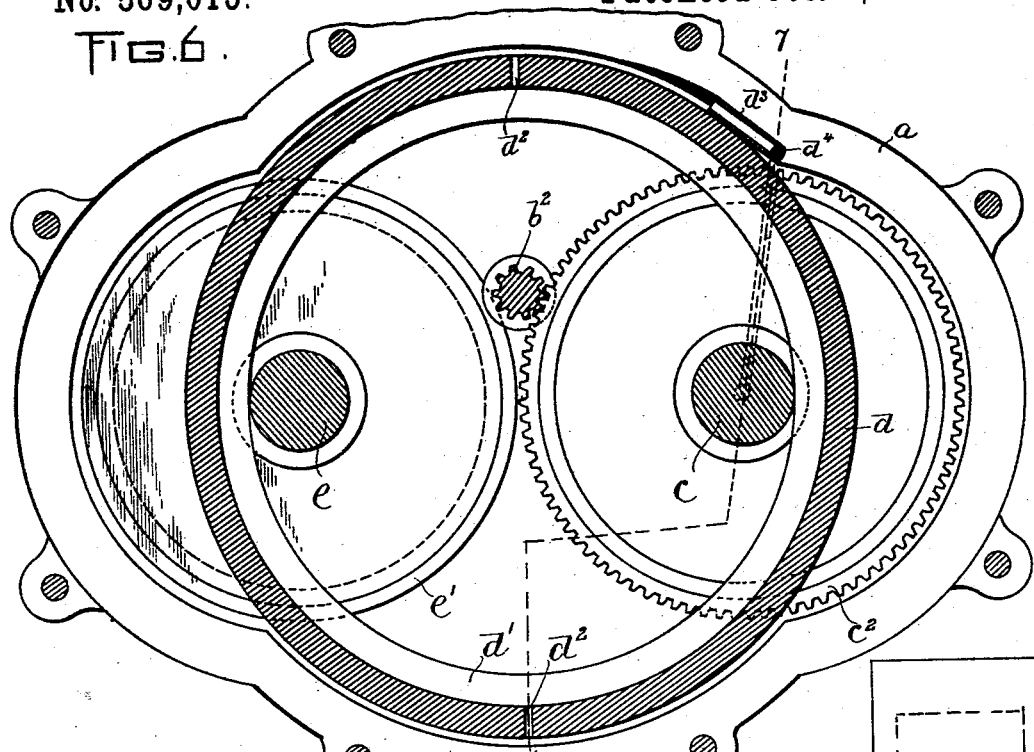
Figure 7:
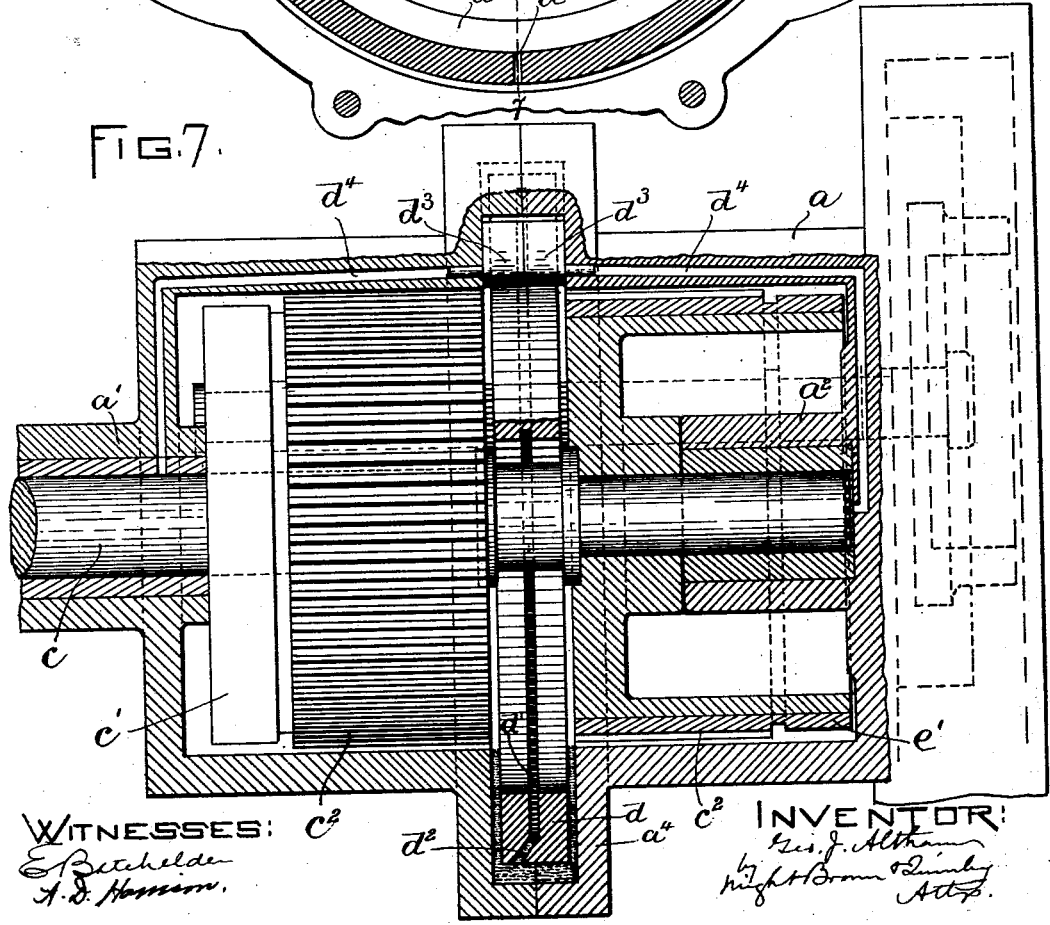

Of the accompanying drawings, forming a part of this specification, Figure 1 represents an end elevation of a power-transmitting mechanism embodying my invention. Fig. 2 represents a section on line 2 2 of Fig. 1. Fig. 3 represents a section on line 3 3 of Fig. 1. Fig. 4 represents a top plan view of the mechanism shown in Figs. 1, 2, and 3, the casing being shown in section. Fig. 5 represents a section on a part of the line 5 5 of Fig. 4. Fig. 6 represents a section on line 6 6 of Fig. 4. Fig. 7 represents a section on line 7 7 of Fig. 6.

The same letters and numerals of reference indicate the same parts in all the figures.

In the drawings, $a$ represents a supporting frame or casing, which may contain any suitable motor, such as the steam-turbine shown in the above-mentioned Letters Patent.

$b$ represents the spindle or driving-shaft connected with and receiving power from said motor. Said shaft is provided with cylindrical portions $b'$ $b'$, which are in rolling contact with the supporting-rolls hereinafter described. The driving-shaft is provided between the portions $b'$ $b'$ with an elongated gear $b^2$, which is preferably formed by cutting gear-teeth in the body of the shaft.

$c$ represents a driven shaft, which is journaled in fixed bearings $a'$ $a^2$ on the supporting-frame, and is provided with gears $c^2$ $c^2$, meshing with the gear $b^2$ on the driving-shaft, said gears $c^2$ being separate from each other to form a space for the reception of the bearing-ring $d$, hereinafter described. The driven shaft $c$ is provided with bearing-rolls $c'$ $c'$, located at opposite ends of the gears $c^2$ $c^2$ and having their peripheries in rolling contact with the bearing portions $b'$ of the driving-shaft.

$e$ represents an idle-shaft, which is journaled in bearings $e^2$ $e^2$, Fig. 2, which are movable toward and from the fixed bearings $a'$ $a^2$ on horizontal guides $e^3$ $e^3$, affixed to the supporting-frame. The shaft $e$ is provided with bearing-rolls $e'$ $e'$, the peripheries of which are in rolling contact with the bearing portions $b'$ of the driving-shaft. The shafts $c$ and $e$ are arranged at opposite sides of the driving-shaft $b$ and somewhat below the latter, so that the peripheries of the rolls $c'$ and $e'$ conjointly form an antifriction bearing or support for the driving-shaft, preventing downward displacement of the latter.

The bearing-ring $d$ above mentioned is of such diameter that it surrounds the shafts $b$, $c$, and $e$, its inner surface bearing simultaneously upon the outer portions of the shafts $c$ and $e$, as shown in Fig. 6, said ring being free to rotate and in close contact with the said shafts $c$ and $e$. The relative arrangement of the ring $d$ and the shafts $c$ and $e$ is such that the ring supports the shafts against lateral movement away from each other, the freedom of the ring to rotate making it an antifriction support or bearing for both shafts. The pressure of the driving-shaft against the rolls $c'$ and $e'$ tends to force the shafts $c$ and $e$ in opposite directions, and thus keeps the shafts in close contact with the inner surface of the ring. The movability of the bearings $e^2$, in which the idle-shaft $e$ is journaled, permits sufficient automatic adjustment of said shaft to maintain the bearing of the two shafts upon the ring regardless of the irregularities of the inner surface of the ring or of any wear of the ring and the portions of the shafts with which it is in contact. It will be seen that by the above-described construction I am enabled to transmit power from the motor through a gear on the driving-shaft relatively of very small size to a relatively large gear or gears on the driven shaft with comparatively small loss of power by friction and without the necessity of lubricating the driving-shaft, which rotates at a high speed, the rolls $c'$ and $e'$ constituting an antifriction-support for the driving-shaft, while the ring $d$ constitutes an antifriction-support for the shafts carrying said rolls and supports practically all the lateral pressure on said shafts caused by the bearing of the driving-shaft on the rolls, so that the friction of the shafts $c$ and $e$ on their bearings $a'$ $a^2$ and $e^2$ $e^2$ is reduced to the minimum.

I prefer to provide the several rolls with steel rings or tires 2 2, as shown in Fig. 3, arranged to bear upon the portions $b'$ of the driving-shaft, the tires on the rolls $c'$ being extended to constitute the gears $c^2$, said tires and gears being supported by drums 3, affixed to the driven shaft $c$.

Endwise movement of the driving-shaft is prevented by means of shoulders 4, formed thereon and bearing against corresponding shoulders on the rolls $c'$ and $e'$. Lateral displacement of the bearing-ring $d$ is prevented by means of collars or flanges 5 5 on the shafts $c$ and $e$.

The ring $d$ constitutes an antifrictional means for laterally supporting the shafts $c$ $e$ independently of their bearings $a'$ $a^2$ and $e^2$ $e^2$. Believing such independent antifrictional support to be new, I do not limit myself to the ring as the supporting means, and may use any other suitable means to the same end.

In Figs. 3, 6, and 7 I show a construction whereby the bearing-ring $d$ is utilized as a means for raising oil to lubricate the bearings of the driven shaft $c$. Said ring is provided with an internal groove $d'$, which receives oil from the offset lower portion $a^4$ of the casing, said portion containing a supply of oil, as shown in Fig. 7. The rotation of the ring causes it to carry oil upwardly, and the ring is provided with outlets $d^2$, extending from the groove through the periphery of the ring. The rotation of the ring is sufficiently rapid to cause the oil to flow outwardly from the groove through said outlets by centrifugal force. Affixed to the upper portion of the casing are pockets $d^2$ $d^2$, which are arranged to receive portions of the oil discharged from the outlets $d^2$ and to deliver the same to passages $d^4$ $d^4$, whereby it is conducted to the bearings $a'$ $a^2$, said bearings being thus kept constantly lubricated. The bearings of the shaft $e$ may be lubricated in the same way or oil may be conducted from the bearings $a'$ $a^2$ to the bearings of the idle-shaft through suitably-arranged passages.

I claim—

1. A power-transmitting mechanism comprising a driving-shaft or spindle, a driven shaft located at one side of the driving-shaft and having gear-toothed connections therewith, an idle-shaft movable toward and from the opposite side of the driving-shaft, and smooth-surfaced rolls on the driven and idle shafts arranged as antifriction-bearings for the driving-shaft.

2. A power-transmitting mechanism comprising a driving-shaft or spindle, a driven shaft located at one side of the driving-shaft and having gear-toothed connections therewith, an idle-shaft movable toward and from the opposite side of the driving-shaft, smooth-surfaced rolls on the driven and idle shafts arranged as antifriction-bearings for the driving-shaft, bearings for said driven and idle shafts, and independent antifrictional means for laterally supporting said driven and idle shafts, whereby the friction of said shafts on their bearings is reduced.

3. A power-transmitting mechanism comprising a driving-shaft, a driven shaft at one side of the driving-shaft and having gear-toothed connections therewith, an idle-shaft movable toward and from the opposite side of the driving-shaft, smooth-surfaced rolls on the driven and idle shafts constituting antifriction-bearings for the driving-shaft, and a ring surrounding the driven and idle shafts and constituting antifriction-bearings therefor.

4. A power-transmitting mechanism comprising a driving-shaft, a driven shaft at one side of the driving-shaft, gears connecting said shafts, an idle-shaft movable toward and from the opposite side of the driving-shaft, smooth-surfaced rolls on the driven and idle shafts constituting antifriction-bearings for the driving-shaft, a ring surrounding the driven and idle shafts and constituting antifriction-bearings therefor, fixed bearings supporting the driven shaft, and movable bearings for the idle-shaft movable toward and from said fixed bearings.

5. A power-transmitting mechanism comprising a driving-shaft, a driven shaft at one side of the driving-shaft, gears connecting said shafts, an idle-shaft at the opposite side of the driving-shaft, rolls on the driven and idle shafts constituting antifriction-bearings for the driving-shaft, a ring surrounding the driven and idle shafts and constituting antifriction-bearings therefor and provided with means for elevating and discharging oil, a conduit arranged to receive oil from the ring, and a bearing communicating with the conduit and receiving oil therefrom.

In testimony whereof I have signed my name to this specification, in the presence of two subscribing witnesses, this 2d day of October, A. D. 1895.

GEORGE J. ALTHAM.

Witnesses:
HORACE BROWN,
A. D. HARRISON.